(No Model.) 2 Sheets—Sheet 1.
A. H. LUBKING.
FEEDER AND SPREADER FOR THRASHING MACHINES.
No. 505,948. Patented Oct. 3, 1893.
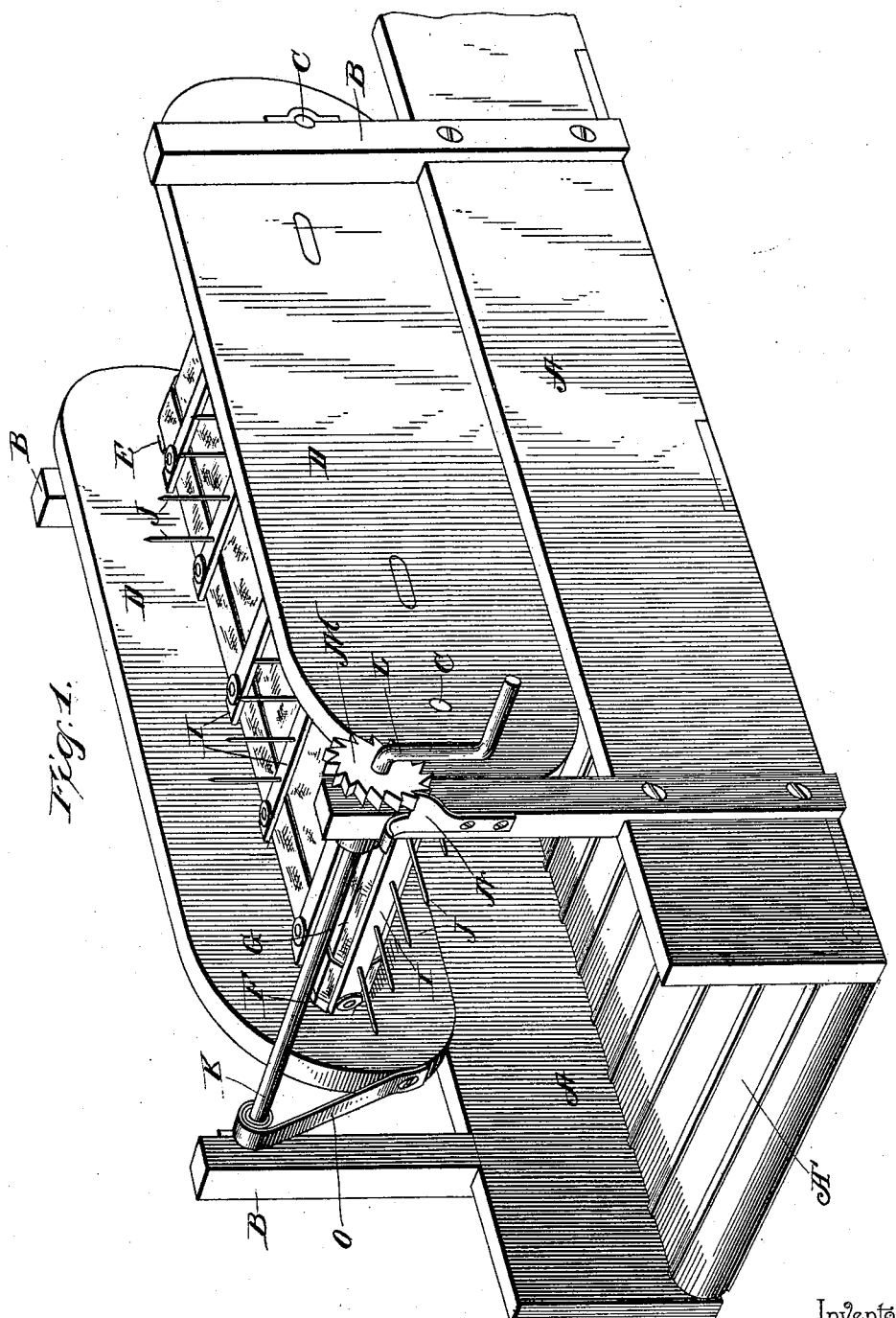

(No Model.) 2 Sheets—Sheet 2.
A. H. LUBKING.
FEEDER AND SPREADER FOR THRASHING MACHINES.
No. 505,948. Patented Oct. 3, 1893.
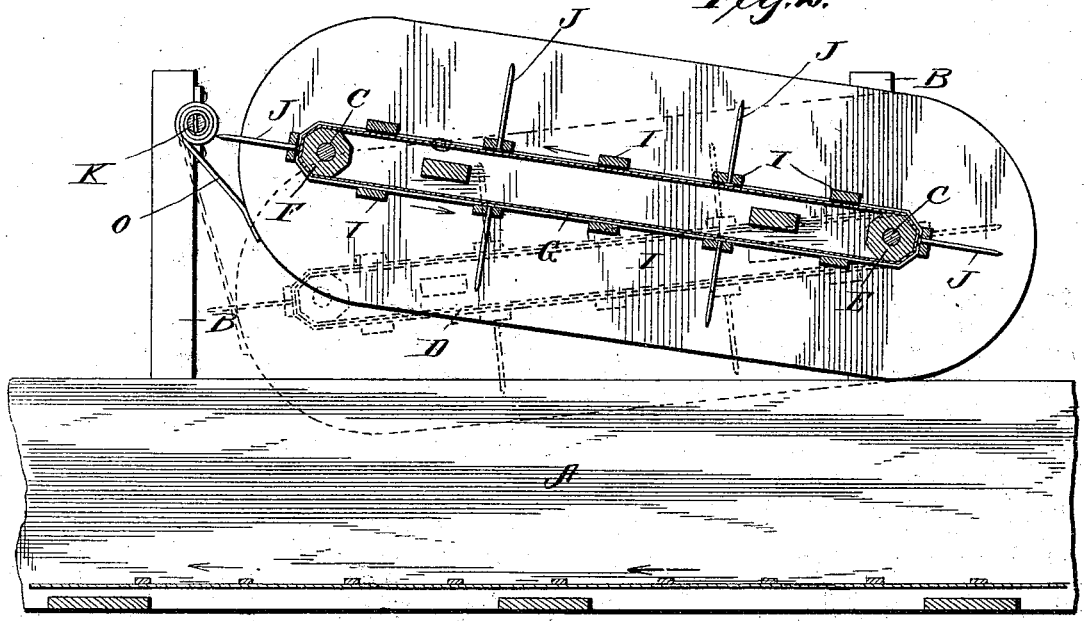
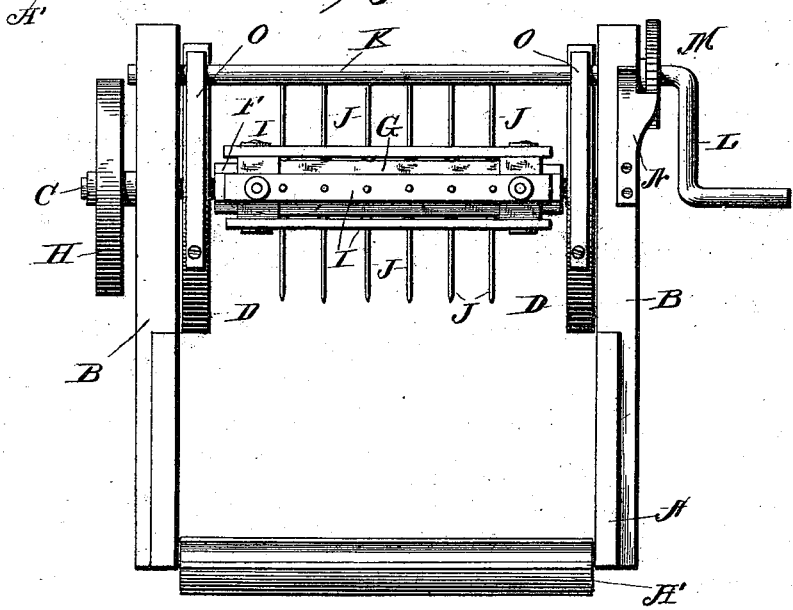
Witnesses          Inventor
                   A. H. Lubking
          By his Attorneys,

UNITED STATES PATENT OFFICE.

ADOLPH H. LUBKING, OF POMEROY, WASHINGTON, ASSIGNOR OF ONE-HALF TO HARRY ST. GEORGE, OF SAME PLACE.

FEEDER AND SPREADER FOR THRASHING-MACHINES.

SPECIFICATION forming part of Letters Patent No. 505,948, dated October 3, 1893.

Application filed February 15, 1892. Serial No. 421,588. (No model.)

*To all whom it may concern:*

Be it known that I, ADOLPH H. LUBKING, a citizen of the United States, residing at Pomeroy, in the county of Garfield and State of Washington, have invented a new and useful Feeder and Spreader for Thrashing-Machines, of which the following is a specification.

This invention relates to feeders and spreaders for thrashing machines; and it has for its object to provide a machine of this character which will serve in the double capacity of a spreader and distributer, thus evenly feeding the grain to the cylinder of the separator.

It is also the object of this invention to provide a spreading attachment for feeders which shall be simple in construction and can be so regulated as to feed any quantity of grain to the thrasher according to the capacity thereof.

With these and many other objects in view which will be obvious to those skilled in the art, the invention consists in the novel construction, combination and arrangement of parts hereinafter more fully described, illustrated and claimed.

In the accompanying drawings:—Figure 1 is a perspective view of a thrashing machine feeder having a spreader constructed in accordance with my invention. Fig. 2 is a vertical longitudinal sectional view of the same, illustrating the adjustment of the spreader. Fig. 3 is an end elevation of the same.

Referring to the accompanying drawings:—
A represents an ordinary feeder box located directly in front of an ordinary thrashing machine and provided with the opposite parallel pairs of upwardly extending bearing arms or standards B, said feeder box accommodating the ordinary feeder apron A' working toward the thrasher.

Journaled in the rear parallel pairs of the upwardly extending bearing standards B is the transverse apron roller shaft C, also journaled in the outer ends of the opposite sides D forming a spreader box, which latter is narrower than the feeder box A and is thus capable of being lowered into the feeder box and into as close proximity to the apron therein as may be desired. The spreader box is thus pivotally mounted upon the roller shaft C at one end and is allowed to be adjusted up and down with relation to such, according to the amount of grain desired to be fed to the thrasher cylinder or the rapidity with which the same is to be fed.

Carried by the roller shaft C and between the pivoted ends of the spreader box is the outer apron roller E, while journaled in the opposite sides D at the opposite swinging end of the spreader box is the opposite apron roller F, both of said rollers accommodating the endless carrier apron G passing thereover. Motion is communicated to said carrier apron from the thrashing machine by a suitable belt passing from one of the pulleys thereof, over the roller shaft pulley H keyed upon one end of the pivoting and roller shaft C so that the spreader apron will work from the thrasher and in an opposite direction to the feeder apron A traveling through the box.

Secured to the top of the endless apron C and at regular intervals thereon is a series of carrying slats I, every alternate one of which is provided with a series of upwardly extending spreading teeth or fingers J, which are designed to spread and distribute the grain to the thrasher cylinder and spread the same as the grain is thrown upon the endless apron to be fed to said cylinder. The fingers or teeth J not only subserve the functions stated, but also prevent the grain from going to the thrasher too heavily and also keep the machine from being clogged or choked up by combing back the grain carried by the feeder apron as much as necessary according to the elevation of the swinging end of the spreader.

Journaled in the inner pair of bearing standards adjacent to the swinging end of the spreader box, is the transverse winding drum or shaft K, journaled in said standards at a higher plane than the outer roller shaft C located at the fixed end of the spreader box. The said winding drum or shaft K terminates at one side in an operating crank handle L and is provided with a regulating ratchet wheel M engaged by the spring pawl or dog N secured to one of said standards. Adjusting straps or cords O are secured to said shaft K and are connected to the free ends of the opposite sides D comprising the spreader box. It will be readily seen, that the fixed or pivoted end of the endless carrier spreader box away from the thrasher is always above the feeding apron at a fixed height, and that by operating the winding drum or shaft, the swinging end of the feeder box may be adjusted at any incline or level desired in close proximity to the apron carrying the grain or not as the case may be and according to the pitch given the said spreader box into the feeder the same adapts itself for spreading large or small quantities of the grain to the thrasher at the option of the operator by combing back the grain heavily or lightly while at the same time serving to spread the grain and evenly distribute the same to the cylinder of the separator.

The construction, operation and advantages of the herein described spreader are thought to be apparent without further description.

I am aware that heretofore, toothed endless spreading belts have been employed but this I do not claim broadly.

My invention consists in the use in connection with a permanent endless apron, of a toothed endless spreading belt traveling in the same direction as the former, whereby the upper side of the former and the lower side of the latter move in opposite directions, and means whereby the interval between the belt and apron may be varied at will by the adjustment of the pivotal frame of the belt, said frame being adapted to fit into the frame of the apron.

Having thus described my invention, what I claim, and desire to secure by Letters Patent, is—

A feeder and spreader for thrashing machines, comprising a parallel-sided feeder-box, a carrying apron arranged to form the floor of such box, means for operating the same, a parallel-sided spreader-frame, said sides being spaced to fit slidably between the sides of the feeder-box, a toothed belt operatively mounted in said frame, pivotal connections between one end of the spreader-frame and the feeder-box whereby the toothed belt may be arranged parallel with and in operative relation to the carrying-belt with the sides of the spreader-frame between those of the feeder-box to hold the contents from lateral escape, means for operating the toothed belt in the same direction as the carrying belt, whereby their adjacent surfaces move in opposite directions, and adjusting devices connected to the free end of the spreader-frame, substantially as specified.

In testimony that I claim the foregoing as my own I have hereto affixed my signature in the presence of two witnesses.

ADOLPH H. LUBKING.

Witnesses:
P. McCLUNG,
F. F. VAN NATTAN.